United States Patent [19]

Goldberg

[11] Patent Number: 4,481,542
[45] Date of Patent: Nov. 6, 1984

[54] COLOR VIDEO HARDCOPY RECORDER, METHOD AND MEDIA THEREFOR

[75] Inventor: Paul R. Goldberg, Palo Alto, Calif.

[73] Assignee: Advanced Imaging Devices, Inc., Mountain View, Calif.

[21] Appl. No.: 359,605

[22] Filed: Mar. 18, 1982

[51] Int. Cl.³ ............................................. H04N 9/491
[52] U.S. Cl. ...................................... 358/331; 358/332; 358/75
[58] Field of Search .................. 358/75, 78, 331, 332; 346/107 R, 108, 110 R, 135.1; 369/44, 108

[56] References Cited

U.S. PATENT DOCUMENTS 4,161,749  7/1979  Erlichman ............................ 358/78
4,366,499  12/1982  Mir ...................................... 358/75

Primary Examiner—Richard Murray
Attorney, Agent, or Firm—Flehr, Hohbach, Test, Albritton & Herbert

[57] ABSTRACT

In a color video hard copy recorder having different areas for recording information representing different colors using a scanning light beam, means are provided for generating signals identifying the different areas and controlling the scanning responsive to the signals so as to record different color information at the different areas.

18 Claims, 9 Drawing Figures

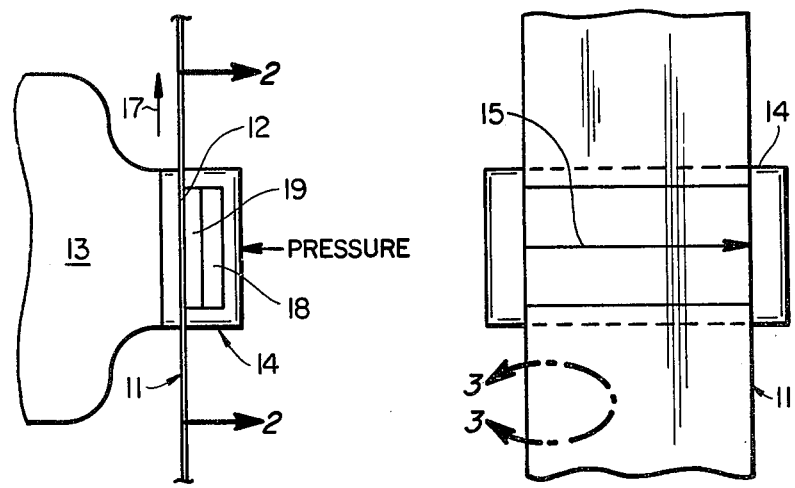
FIG_1    FIG_2
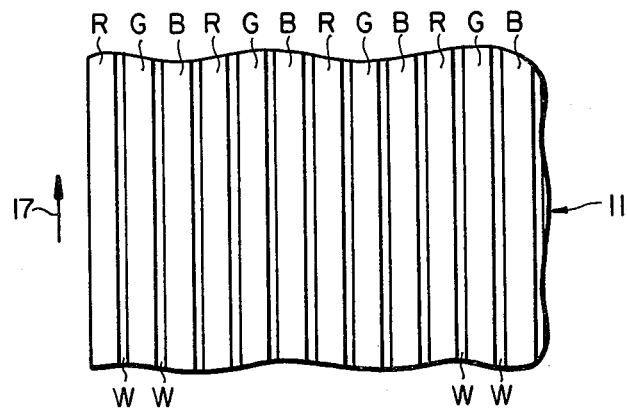
FIG_3
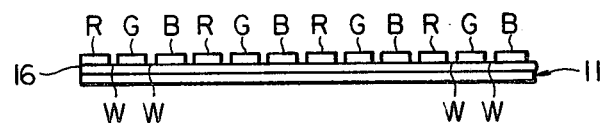
FIG_4

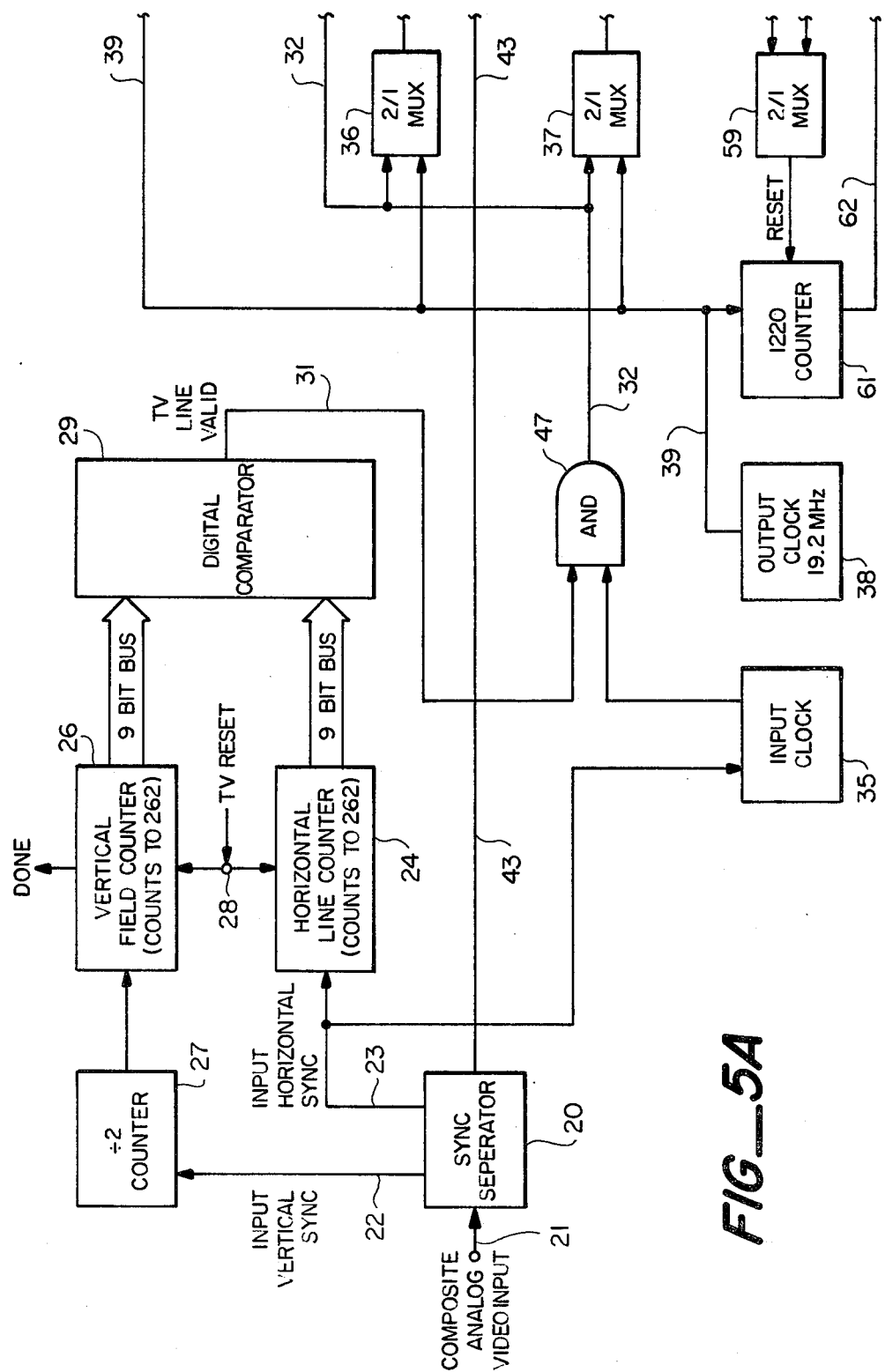
FIG_5A

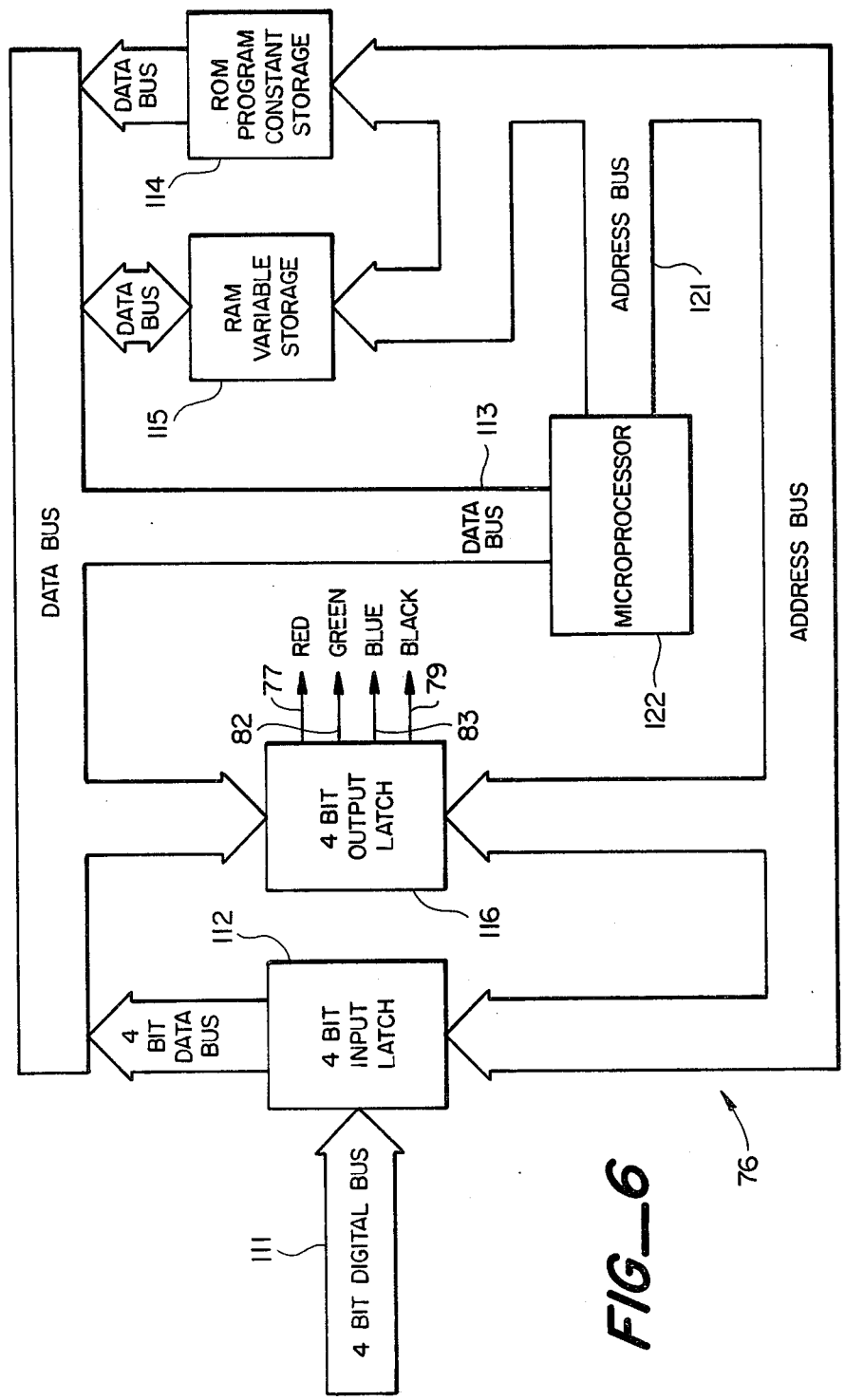
FIG_6

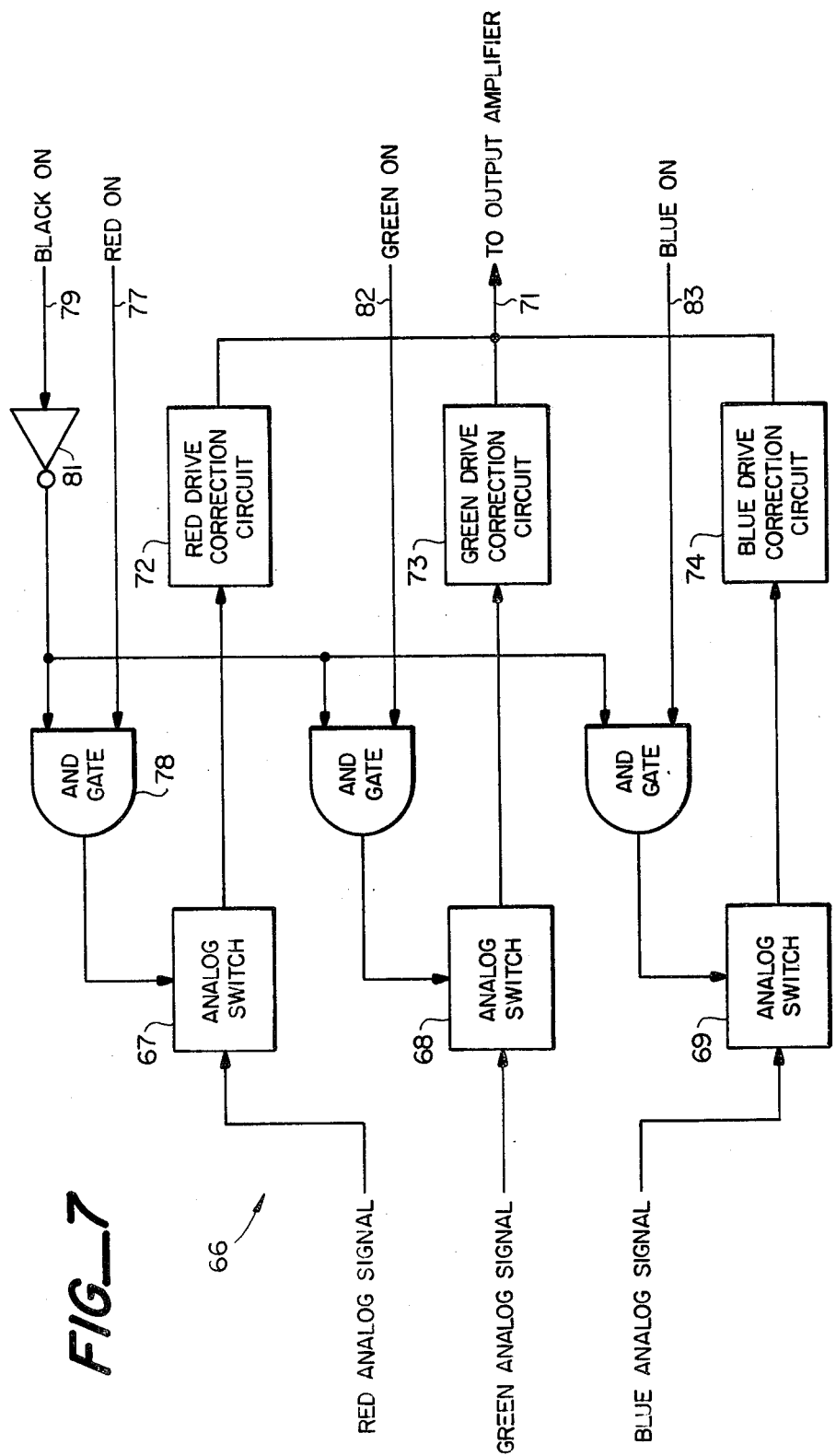
FIG_7

COLOR VIDEO HARDCOPY RECORDER, METHOD AND MEDIA THEREFOR

This invention relates to an apparatus and method for producing full color hardcopy from line scanned electronic signals such as television format video signals, by the use of a recording cathode-ray tube or other light scanning device, and to a panchromatic photosensitive media for use therewith.

All colors that are perceived by the human eye can be created by the proper mixing of three primary colors: red, green and blue. If a series of positive transparencies are created by first exposing a section of black and white panchromatic film through a red filter, another section through a green filter and a third section through a blue filter, the original scene, in full color, can be reconstructed by projecting these transparencies through their respective filters and precisely overlapping the three resulting images. Only the red information will appear on the transparency photographed through the red filter. All other wavelengths of light will be blocked out and thus appear black on the positive transparent film. The same is true for the sections of film exposed through the other two colored filters except that green and blue would be substituted for red. A red barn, for example, will appear as some shade of grey, depending on how brightly the barn was originally illuminated and how much light it was capable of reflecting, on the transparency photographed through the red filter. On the other two slides, the barn would be black. Upon projection, the slide projected through the red filter would cause a red barn to appear on the screen. The other two slides would block out all light in the area of the red barn. Thus, the barn would appear red to an observer. If the barn was yellow, a color composed of red and green light, the red and green transparencies would show a barn in some shade of grey. When projected, light through the red and green filters would mix in the area of the barn and the barn would be colored yellow. Again in this case the barn on the blue section of film would be black and not contribute any light energy to this portion of the scene. All other colors in the visible spectrum would be created in much the same way. The image of a magenta colored fence would be composed of light from the red and the blue slide. A cyan colored lake would be made up of energy from the green and blue transparencies. A white windmill would be illuminated by radiation from all three slides.

The full color video hardcopy recorder and method of the present invention utilizes the fact that the three primary colors, red, green and blue, can be employed to produce all other colors. Instead of breaking up a colored scene, such as the farm scene described above, into three seperate images, each carrying information associated with one of the primary colors, and mixing the light transmitted through the resulting transparencies by superposition, the color video hardcopy recorder of the present invention separates the colors spacially and uses the limited resolution of the human eye to combine the tri-color information.

In order for a spacial color separation system to function it is necessary to devise a means which causes the information associated with each primary color to be placed in the area of the image displaying that particular color. Turning back to the farm scene example, let us expose a single sheet of panchromatic black and white film through a transparent screen composed of red, green and blue stripes or lines. In this case light from the red barn would pass only through the portions of the screen which are red, namely the red stripes and expose the positive transparency film underneath.

Assuming that the red light reflected from the barn is monochromatic no light from the barn would pass through the green and blue colored stripes. Thus the area under these stripes would be black when the film is processed. A close inspection of the transparency would reveal that the barn was comprised of one-third grey stripes and two thirds black stripes. If the stripes are very narrow and the slide is viewed from a distance, the individual grey colored stripes will not be able to be visualized and thus the barn will look completely grey. If the original multicolored striped screen is placed over the processed transparency in the same positional orientation as during the exposure to assure that the red stripes overlay the portion of the image that was exposed through the red stripes, the green stripes are over the area exposed through green stripes and the blue stripes cover the film exposed through the blue stripes, the projected image will show a red barn. This is due to the fact that light will only pass through the grey areas underneath the red filter stripes, while no light will pass through the black film surface underneath the green and blue colored stripes. As in the case when the slide is viewed directly, the individual color stripes must be very narrow if the barn is to appear as if it is completely colored red. Stripes, which are too wide or too widely spaced will cause the projected image to display red stripes separated by two black stripes.

If the barn were colored yellow, the black and white film would appear grey underneath the areas covered by both red and green stripes. The projected image would show a barn comprised of closely spaced red and green stripes separated by a black stripe. At a sufficient viewing distance the barn would look yellow. A white barn would expose the film underneath all of the three colored stripes, thus the projected image would be made up of red, green and blue tinted stripes and would be perceived as white.

Hardcopy recorders have been developed for recording black and white video images or data on photosensitive media. One type of recorder employs a fiber optics cathode ray tube (CRT) to expose the photosensitive media. The photosensitive media is pulled from a supply roll and held in intimate contact with the face of the fiber optic. The media is exposed a line at a time as it moves past the scan tube. The amount of exposure depends on the intensity of the light eminating from the fiber optic CRT, the scan rate and the film speed. Various systems have been proposed for controlling the exposures. Systems of this type have been described in U.S. Pat. No. 4,038,618 and in my copending application Ser. No. 303,876, filed Sept. 21, 1981 entitled Apparatus and Method for producing Images on a Photosensitive Media.

The prior art systems have been confined to the formation of black and white images on photosensitive copying media. There is a need for a recording system capable of recording color video images on photosensitive media and more particularly a system for making hardcopy of the video information.

It is an object of the present invention to provide a color video hardcopy recording system and method.

It is another object of the present invention to provide a photosensitive media for providing hard copies of color video informaton.

It is another object of the present invention to provide a recording media including a photosensitive layer and a pattern of sequential transparent areas over or under said layer each representing a primary color with white or clear areas serving to index the colored areas.

It is another object of the present invention to provide a color video hardcopy recording system and method using a media including a photosensitive layer and pattern of transparent or translucent sequential areas each representing a primary color separated by white or clear areas serving to index the colored areas, including means for detecting and identifying the colored areas and controlling the exposure of said photosensitive media at said areas.

The foregoing and other objects of the invention are provided by employing a novel photosensitive medium which includes a photosensitive layer with a plurality of sequential transparent lines or stripes having primary colors separated by indexing stripes overlying or underlying said photosensitive layer and a recording system which scans the photosensitive medium to develop an indexing and color strip position signal and which exposes the medium with lines having modulated intensity correlated to the scanned stripes.

The invention will be more clearly understood from the following description taken in conjunction with the accompaying drawings of which FIG. 1 is a schematic view of a fiber optic scanning cathode ray tube and detecting-identifying means associated with a photosensitive media;

FIG. 2 is a view taken along the line 2—2 of FIG. 1;

FIG. 3 is an enlarged view of the portion 3—3 of the medium shown in FIG. 1;

FIG. 4 is a side elevational view of the media shown in FIG. 3.

FIGS. 5A, 5B and 5C is a block diagram of the electrical circuit for a color video hardcopy recorder;

FIG. 6 is a block diagram of the color position decoder circuit of FIG. 4C;

FIG. 7 is a block diagram of the color switch and corrector of the circuit of FIG. 5C.

Figure 5B:
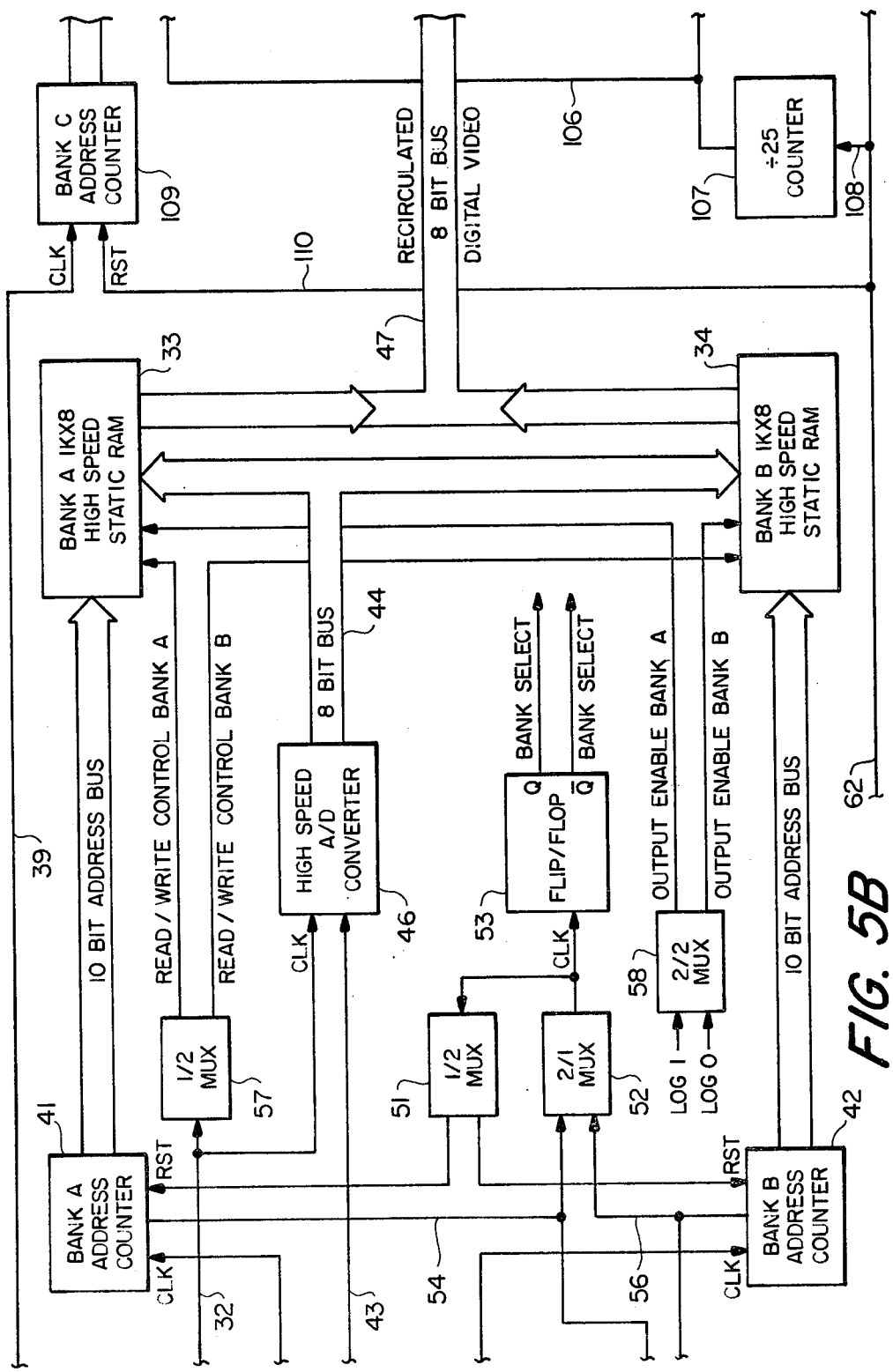

Referring to FIGS. 1–4 there is illustrated a photosensitive media 11 being pulled past the face 12 of a fiber optics cathode ray tube 13 and pressed against the face of the tube by a pressure pad assembly 14. As is well known the scan tube includes on its face a plurality of optical fibers arranged in a line and excited as the electron beam of the cathode ray tube strikes the phosphor on the face of the cathode ray tube. The intensity of the light transmitted by the fibers depends upon the electron beam intensity. The electron beam is scanned across the face of the tube by suitable beam deflection means such as electrostatic or magnetic deflection means and associated electronic controls well known in the art.

In accordance with the present invention the photosensitive media 11 which may be translucent or transparent non-opaque is coated with a photosensitive layer 16. In the preferred embodiment the photosensitive layer is developed by heat or is heat sensitive. Other types of media may be used and are within the scope of the present invention. In addition the photosensitive media is provided a plurality of spaced colored transparent areas or lines which transmit light at the primary colors to the photosensitive layer. In one embodiment red, green and blue transparent stripes are printed longitudinally along the media and spaced from one another by narrow spaces, FIGS. 3 and 4. A fibre optic cathode-ray tube, or other scanning light source exposes the media a line at a time as it is moved past the face of the cathode ray tube. This is accomplished by drawing a single line of light onto the face of the fiberoptic cathode-ray tube while the media is pressed firmly against and moved past the face of the tube. Each scan line which exposes the media carries information regarding the intensity and hue of the image being recorded. In operation, each scan line or series of scan lines carries data for one primary color, if the stripes extend across the media, or all primary colors, serially sequenced, if the stripes are at some other orientation. When media overlayed with a red stripe is directly opposite the fiberoptic cathode-ray tube's illuminated trace, information associated with red objects in the scene will be modulating the intensity of the trace, when the green stripe is in position to be exposed, green information would be channelled to the cathode-ray tube, when the blue stripe is properly situated the cathode ray tube would display the scene's blue information. If the colored stripes were underneath the photosensitive media the description above would still be valid.

The resulting image, once developed, will display the original colors of the scene. This is due to the fact that the light reflected from the media, if it is paper based, must pass through the preprinted red, blue and green stripes before it can be viewed. If the media is transparent the light passes through the colored transparent areas in stripes. The areas of the image which are to display red will be grey in color only under or over the red areas or stripes. They will appear black under or over the green and blue areas or stripes. Thus, light will be reflected or transmitted, in varying degrees, through the red stripes or areas while the green and blue stripes will remain dark. The same is true for the areas which are to appear green and blue. Light will be reflected or transmitted only in the areas where green or blue objects are to be found. Therefore, a full color hardcopy image will be created in the same manner as described above for the spacial color separation system.

It will be apparent that in order for the beam to properly expose the media the recorder must at all times have information regarding position of the beam and with respect to the stripes or areas and their colors.

The method to be described to determine the location of the stripes or areas with respect to the scanning light beam is extremely tolerant to variations in photosensitive media color stripe or area specifications: namely color stripe width or area angle with respect to direction of the scanning beam; color stripe density and color stripe configuration. The method and apparatus to be described will determine the color of each stripe as it is interrogated by a white scanning light beam such as from the fiber optics cathode-ray tube. FIGS. 1–4 show an apparatus which performs this task. FIGS. 3 and 4 shows photosensitive media on which preprinted red, green and blue (RGB) stripes have been oriented parallel to the direction of media travel 17 and perpendicular to the direction of CRT trace scan 18. The colored stripes are separated by narrow white or clear spaces W. This arrangement has been chosen to facilitate the explanation of the concept. In fact the colored stripes and white or clear spaces could have been parallel or at any arbitrary angle with respect to the CRT trace.

The system shown employs a fiberoptic CRT with a spot size less than the width of one primary colored trace with the face of the tube coated with a P4, P45, P48 or similar white phosphor. A pressure pad 14 presses the media against the face of the tube. A large area photosensor 18 covered with either a cyan, magenta or yellow filter 19 is imbedded in the pressure pad. This filter-photosensor sandwich is pressed up against the back of the photosensitive media such that light which passes through the back of the transparent or translucent media, such as coated paper, passes through the complementary colored filter 19 and then strikes the photosensor. The filter-photosensor combination covers the full width and height of the fiber optics CRT thus allowing it to receive light from any point on the face of the tube. In one example a cyan colored filter is utilized whose light transmission characteristics had been chosen to allow it to pass more green light than blue light. Therefore, if red light impinges upon the filter no light will pass through to the photosensor, if green light strikes the filter a certain amount of light will be allowed to pass, if blue light strikes the filter less light than that transmitted for green will make its way to the photosensor and if white light encounters the filter a maximum amount of light will pass. It can be seen, therefore, that as the CRT trace crosses stripes of different colors and intervening white or clear spaces the electrical signal output from the photosensor will take on four distinct values depending upon what colored stripe, if any, is being illuminated. A white or clear space will produce a maximum output. A green stripe will produce the next to the highest output, a blue stripe will produce a medium output and a red stripe will produce no output. Circuitry within the color video hardcopy recorder, to be described, will sense these different voltage levels and cause the data being sent to the CRT to be the appropriate data for the colored stripe being lit. The white light pulse will be used to determine when the colored stripes are changing and thereby give the system sufficient time to switch between data for different colors. Thus, the red, green and blue information will be recorded in the correct place on the image regardless of the orientation of the stripes.

Under normal conditions the beam of the CRT is being constantly modulated by the intelligence being recorded.

However, color detection requires that the amount of light being produced by the CRT be held constant. This is achieved by drawing a constant intensity line once every fixed number of CRT scan lines during which time the sequence of color stripes along the scan is detected.

The incoming television signals are stored in digital form and written on the photosensitive media multiple times as the media moves past the face of the fibre optics CRT. The system may be configured to write each line of incoming video information 25 times before it acquires and begins writing the next line. Thus "stealing" of one line for the purpose of color data positioning would be undetectable on the final color hardcopy output. The speed at which the photosensitive media moves to create the color hardcopy is slow in comparison to the rate of the CRT scan. Adjacent scan lines significantly overlap. The loss of one data line under these conditions would go unnoticed. In addition the photosensitive media is being exposed by light integration in this system because of the repetitive overlapping of data. Therefore, the loss of one line of data out of 25 and its replacement with a single constant intensity line would have almost no effect on the overall exposure of the media.

Although the system can detect where the color stripes are and which color stripe the CRT beam is currently striking, this information is only available during the time the constant intensity trace is interrogating the media for color stripe position data. The system digitally stores the train of multilevel pulses which are created during the time the color stripe information is being detected, and plays them back in synchronism with the video data being written by the fiberoptic cathode-ray tube onto to the photosensitive media for subsequent lines until a new reference is established. The color data can now be correctly positioned over the appropriate red, green or blue stripe. By allowing the media to move only a small number of trace widths between color retrieval activities, little chance exists for the RGB stripes to change their position, relative to the data being written by the fiberoptic CRT between, the time of color position acquisition and the drawing of the last data line before color position update.

Whether or not the image produced displays the colors in the scene being recorded with the correct hue and saturation is dependent on the sensitivity of the photosensitive media to each color in the spectrum, the spectral transmission characteristics of each color stripe and the spectral emission characteristics of the white phosphor used in the fiberoptic cathode-ray tube. All of these variables can be compensated for by adjusting the base intensity of the cathode-ray tube trace individually for each of the primary colors. The method to be described to perform this function utilizes the color stripe position data. Whenever the CRT's beam is over a red, green or blue stripe the present system will alter the intensity of the trace in accordance with a preprogrammed correction factor.

The recording system and method of the present invention is described in more detail with reference to FIGS. 5–7. The preferred embodiment of the system is configured to accept NTSC and PAL color composite television signals. In order to record the incoming color television video data in the correct line sequence it is necessary to realize that most television signals use an interlaced vertical scanning technique. That is, each field of the television image represents only half of the data lines present in the complete image and that the first line in the first field, field A is not followed by the second line of the television image. It is followed by the third. The second line of the television image appears as the first line of the subsequent field, field B. Thus, two succeeding fields are interdigitated. In order for the system under consideration to correctly record this interlaced signal it is necessary that the image be frozen for the entire recording process. Under this condition all the lines of both fields A and B will repetitively appear on line 21 of FIG. 5A. This will allow line one from field A to be acquired, followed by a 16.67 millisecond wait for a NTSC signal from field B to be acquired. The third line is acquired from the following repeat of field A and the fourth line is acquired from the following repeat of field B. The acquisition sequence just described continues until all 525 lines of an NTSC image or all 625 lines of a PAL image are captured.

Sync separator 20 strips the horizontal and vertical sync signals from the incoming TV input signals 21 and places them on lines 22 and 23, respectively. Horizontal line counter 24 employs the horizontal sync signal on line 23 to determine which horizontal line in a particular one of the 525 or 625 vertical fields, required for the recording of the full TV image, is currently appearing on the input. Vertical field counter 26 counts the number of the field from which the current line is being taken. Note that the vertical sync signal is divided by two by the action of divide by two circuit 27. This causes the vertical field counter to increment only on every other field. The reason for this will become clear shortly. A color TV image is recorded after both vertical field and horizontal line counters have been reset to zero by a signal on TV reset line 28. At this point digital comparator 29 senses a comparison and through TV line valid 31 causes the gated input clock signal, which appears on line 32, to be turned on. This in turn causes the writing of the first line of input TV data in the appropriate RAM bank 33 or 34, FIG. 5B. At the occurance of the next horizontal line, horizontal line counter 24 updates its count and, because vertical field counter 26 is still at count zero, the TV valid line signal on line 31, from digital comparator 29, goes off thereby shutting off the gated input clock. The action of shutting off the gated input clock places the scan conversion portion of the system, to be described in detail later, into a hold mode in which it recirculates and writes to the fiberoptic cathode-ray tube the horizontal line just acquired until a new line is available. The following 260 horizontal lines do not cause a comparison and thus the TV valid line remains low and no new line is recorded. On the occurance of the next field of TV video, vertical field counter 26 is not updated because of the action of divide by two circuit 27. Therefore, the first line from the next field causes a comparison and is sent through the system to be ultimately recorded on the photosensitive media by the recording fiberoptic cathode-ray tube. Note that this line is really the second line of the TV image and is recorded in the proper sequence as desired. When the next TV field occurs, vertical field counter 26 is updated and a comparison will take place when the second line of the next TV field is present at the input of the system. This line will be written on the photosensitive media as the third line acquired, the order which it actually appears in the TV image. The process described above continues until 525 or 625 lines have been written on the photosensitive media. At this point the carry bit of vertical field counter goes high and the color television recording process is complete.

The gated input clock 35 appearing on line 32 is connected to one input of digital multiplexers 36, 37. The other of digital multiplexers is connected to output clock 38 on line 39. These digital multiplexers are used to switch address counters 41 and 42 associated with random access memory banks 32 and 34 between the gated input clock signals appearing on line 32 and the output clock signal appearing on line 39. RAM banks 33 and 34 and address counters 41 and 42 comprise the major elements of a double buffered scan conversion system. This system basically stores a line of input stripped analog video, appearing on line 43 which has been converted to an eight bit digital signal on line 44 by the action of high speed analog to digital converter 46, and plays it back at a fixed rate on line 47 which feeds high speed digital to analog converter 8, FIG. 5C. In order to do this without an interruption of output signal, RAM bank 34, for example, repetitively plays back previously acquired data. The roles of the two RAM banks are then reversed such that the data just collected by RAM bank 33 is played back repetitively until RAM bank 34 has stored the next full line of data. The rate at which the input data is written is determined by the gated input clock signal on line 32 which drives the clock input of high speed analog to digital converter 46 and the appropriate address counter through multiplexers 36 or 37. The rate at which the output data is read back is determined by output clock 38 driving the appropriate address counter through line 39 and multiplexer 36 or 37.

Multiplexers 51 and 52 in association with flip-flop 53 form the RAM bank selection system. First assume that RAM bank 3 is in the write mode and RAM bank 34 is in the read mode. Then the carry output bit line 54 of address counter 41 is connected to the reset line of address counter 42 through multiplexer 52 and 51 as well as to the clock input of flip-flop 53. When RAM bank 33 is full, which occurs when bank address counter 41 reaches its maximum count, carry out bit line 54 will pulse on the next clock cycle. This will reset address counter 42 through multiplexer 51 and change the state of flip-flop 53. RAM bank 34 is now ready to accept new input data because its address counter 42 has been reset to zero and RAM bank 33 can now be read out because its address counter 41 has just indicated that it has reset itself to zero by issuing a carry bit. The changing of state of flip-flop 53 causes the gated input clock to now be applied, through multiplexer 37, to address counter 42 and the output clock signal to be applied to address counter 41 through multiplexer 36. In addition, the carry bit out line 56 of address counter 42 is now connected to the reset line of address counter 41 because multiplexers 51 and 52 have been forced to switch states due to the fact that flip-flop 53 has switched states. This sets up the system so that it may once again interchange RAM bank read/write functions when RAM bank 34 has acquired the next full line of input data.

Three other digital multiplexers are required to totally reverse the read/write functions of the two RAM banks. These are multiplexers 57, 58 and 59. Multiplexer 57 is used to switch the gated input clock between the read/write control lines of RAM banks 33 and 34. This assures that the proper RAM bank is placed into the write mode when the incoming data to be stored is available at its data input lines. When a RAM bank is in its read mode its data input lines, which are connected to eight bit digital bus 44 coming from high speed analog to digital converter 46, are inhibited, thus the data input lines of RAM banks 33 and 34 can be connected together as shown in FIG. 5B.

Multiplexer 58 switches a logical zero to the output enable line of the RAM bank which is currently in the write mode and a logical one to the RAM bank currently in the read mode. This allows the data output lines of RAM banks 33 and 34 to be connected together to form single output bus 47 because the output of the RAM in the write mode is effectively disconnected from the output bus by this action.

Multiplexer 59 is used to direct the carry bit associated with the RAM bank currently in the read mode to the reset input of divide by 1220 counter 61. This assures that the 15750 Hz signal appearing on line 62, derived from output clock 38 by the action of divide by 1220 counter 61, is always properly synchronized with the data from the RAM bank which is currently being read. Since the signal on line 62 triggers the horizontal ramp generator, which ultimately deflects the electron beam of the recording fiberoptic cathode-ray tube, the scanning electron beam will thus be driven so that it is synchronous with the data currently being read from the RAM bank in the read mode. This condition is required for the proper recording of the data on the photosensitive media.

The fixed scan rate digital output data read from the chosen RAM bank is repeated numerous times before the RAM bank roles are switched and new output data is transfered to output bus 47. The number of times the old data is read out from one RAM bank is determined by the length of time that is required to acquire the next line of data in the other RAM bank. Thus, if it takes 16.66 milliseconds, the time to acquire one NTSC color television field, to load the RAM bank accepting data and the output period is 63.5 microseconds (1/15750), then the previous line of data will be repeated 262 times before it is updated. If a different fiberoptic cathode-ray tube sweep rate is chosen or if the input data line rate is altered, as it would be for a different television standard, such as PAL, then the number of RAM re-reads, and hence data repeats on the fiberoptics cathode-ray tube would change, but the concept would remain the same. It is apparent that the lines are overwritten a number of times since the recording media will only have moved a small distance in this short time. The above described recording system has been described in co-pending U.S. patent application Ser. No. 303,876, filed Sept. 21, 1981.

Before the recirculated digital data is applied to the input of the recording cathode-ray tube, it is first converted back into analog form and demodulated in order to separate the three color signals, red, green and blue, on to three individual lines. These three lines must then be switched to the input of the fiberoptics cathode-ray tube such that the red information is written when the CRT beam is over a red stripe, which has been preprinted onto the photosensitive media, the green information is written on a green stripe and the blue information is written on a blue stripe.

The unique apparatus and method employed to perform this function constitutes the present invention.

The color demodulation mentioned in the previous paragraph is performed by chroma demodulator 63 connected to the output of the high speed digital to analog (D/A) convertor by line 64. The circuitry used to separate the composite color signals into its three color constituents is the same as that employed in the modern color television receiver. These three signals are then sent to color switch and correction circuit 66, shown in more detail in the block diagram FIG. 7.

Referring to FIG. 7, analog switches 67, 68 and 69 are used to place the red, green or blue signals on output line 71 through their respective color drive correction circuits, 72, 73 and 74. When color position decoder 76, FIG. 5C, determines that the fiberoptic cathode-ray tube beam is over a red stripe, it places a logic "1" level on line 77. This "red on" line causes a "1" to appear on the output of AND gate 78 if color position decoder 76 does not send a "black on" signal on line 79. Normally line 79 is at logical "0" level and thus a logical "1" appears on the output of inverter 81. This "1" is transferred to the AND gates which control red, blue and green signal analog switches 67, 68 and 69. With a logical "1" on one input of these AND gates the analog switches will be controlled directly by the signals, "red on", "green on", and "blue on", on lines 77, 82 and 83 as just described for the red channel. With a logical "0" on one input the these AND gates the switches will remain off and no signals will be transmitted to the correction circuits and output line 71.

Color correction circuits 72, 73, 74 alter the gain and/or offset of the red, green or blue color signals which are switched on to their respective inputs. This action is required to compensate for differences in spectral output of the white cathode-ray tube phosphor, spectral sensitivity of the photosensitive media and spectral transmission characteristics of the color stripes if they are overlayed on the photosensitive media.

The "black on" signal, line 79 is necessitated by the fact that color position decoder 76 will place erroneous signals on the "red on", "green on" and "blue on" lines as the cathode-ray tubes beam moves between one color stripe and the next. For example, as the beam moves from a red stripe toward a green stripe it will first pass through a white space or region. During this transition from red to white to green all of the color control logic signals will be sequentially placed at logic "1" level. The reason for this will be clear when the color position decoder is fully described. It is therefore necessary to initiate the "black on" logic signal in order to avoid the placement of erroneous information on the photosensitive media.

Figure 5C:
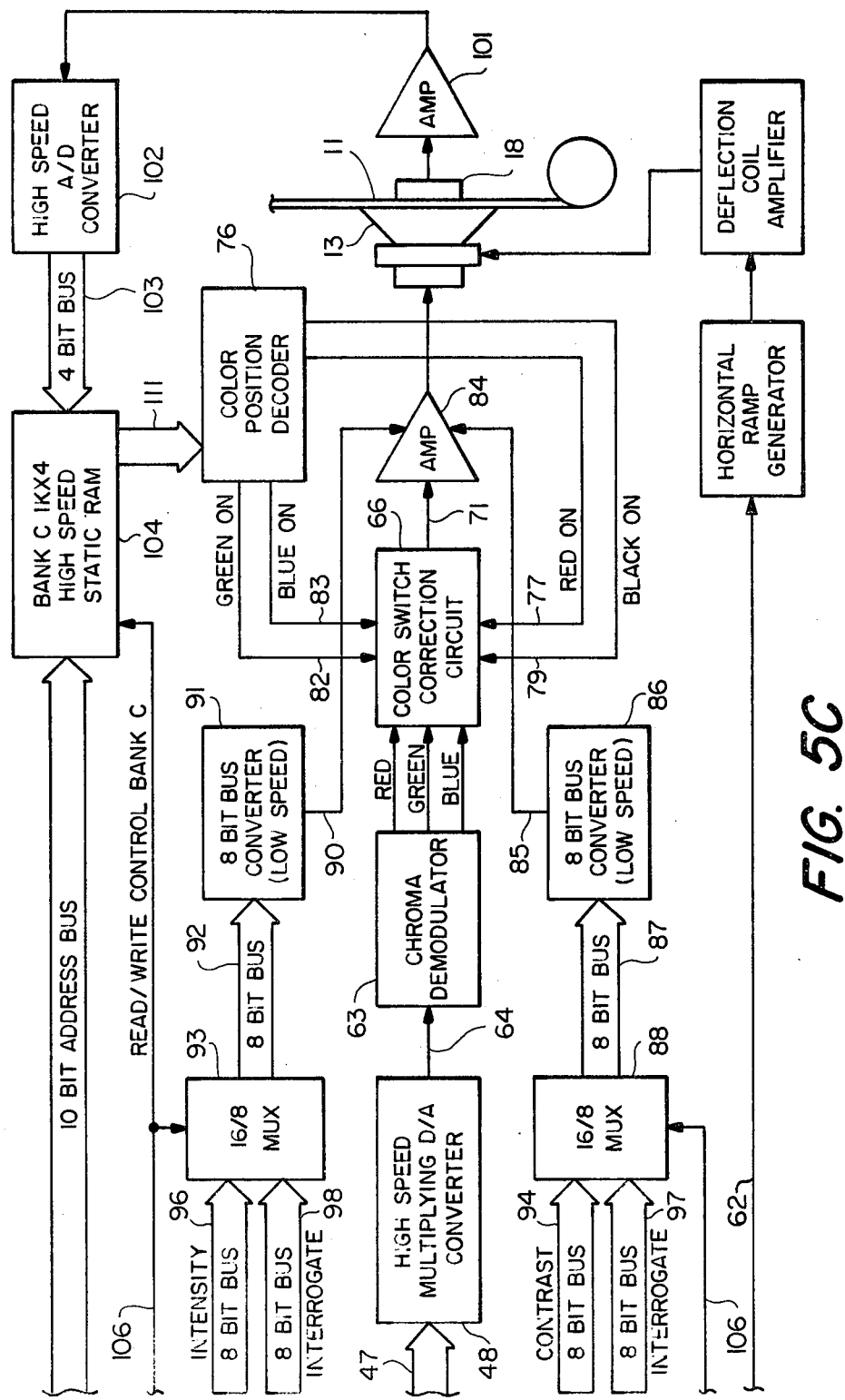

Referring to FIG. 5C line 71, which carries the switched color signals from color switch and correction circuit 66, is connected to output amplifier 84. The gain and output offset of this amplifier is controlled by D/A converter 86 through line 85 connected by bus 87 to multiplexer 88 and D/A converter 91 through line 90 connected by bus 92 to multiplexer 93. The particular gain and intensity setting depends upon four independent eight bit digital buses. Contrast bus 94 and intensity bus 96 are set by the user of the color hardcopy recorder. Contrast interrogate bus 97 and intensity interrogate bus 98 are predefined fixed values which cause the cathode-ray tubes beam to produce a constant light output. This constant intensity beam is utilized during the process of color stripe position interrogation.

In order to correctly expose the photosensitive media means are provided for determining which color stripe the beam is currently illuminating. The physical embodiment of the color stripe sensor mechanism, which detects the red, green or blue color stripe location has already been described. The analog output of the large area photosensor 18 is first amplified by high speed analog amplifier 101 and then converted into a four bit digital signal by high speed A/D converter 102. The resultant digital signal appears on four bit digital bus 103. This analog to digital conversion takes place at a 19.2 megahertz rate because A/D convertor 102 is driven by the output clock signal which appears on line 32. Four bit bus 103 serves as the input bus to high speed RAM bank 104.

As the cathode-ray tube beam progressively crosses the red, white, green, white, blue, white stripe pattern printed on the photosensitive media, the color stripe sensor will produce a voltage corresponding to each kind of colored stripe being scanned. This information, after being amplified, is digitized to four bits representing sixteen discrete levels. The color position information is only accessed during a period of time that the cathode-ray tube beam's intensity is held at a constant level. This is true because the information regarding the spectral qualities of a particular stripe is contained in the amplitude of the electronic signal emanating from the color position sensor. Any change in scanning beam light output would produce false color position data.

Thus, the present invention utilizes a unique method of "stealing" a scan line and causing this entire stolen line to be drawn at a constant intensity while the color position information is being acquired. In the example to be described the exact color stripe position information is only available once per 25 scan lines. This information is stored and repetitively provided in synchronism with the light beam scanning the photosensitive media. This will assure that the correct color is over written with the appropriate color information between color position interrogation cycles. It should be noted that in the preferred embodiment of the present invention the photosensitive media travels at a maximum rate of 19 millimeters per second. Thus, if the scan rate is 15750 Hz and there is one color interrogation cycle every 25 beam scanning cycles, the media moves a maximum of 0.0316 millimeters between color position acquisition periods. Thus, the stripe position information is refreshed before a change in color stripe position can cause misregistration.

High speed RAM bank 104 serves as the color position information storage mechanism between color data collection cycles. It is placed in the "write mode" by the signal on line 106 which emanates from divide by 25 counter 107 which counts the scanning beam triggering pulses appearing on line 108. Therefore, once every 25 cathode-ray tube scans line 106 goes high and switches contrast multiplexer 88 and intensity multiplexer 93 into their "interrogate" mode and places RAM bank 104 into its data collection mode. Contrast multiplexer 88 is set to the "0" contrast signal, which appears on contrast interrogate bus 97, during the color interrogation interval. This disallows modulation of the scanning beam by the incoming recirculated color television video. Intensity multiplexer 93 is set to the known constant intensity value, which appears on intensity interrogate bus 98, at this time and thus causes the cathode-ray tube scanning beam to assume a constant intensity for the entire width of the trace. In order to assure that the data collected by RAM bank 104 is placed into and read from the appropriate data cells, address counter 109 of FIG. 5B is reset once per CRT scan line by the scanning beam triggering pulses which appear on line 110 and clocked by output clock 38 through line 39 of FIG. 5A.

After the collection of the color stripe position information, RAM bank 104 is placed into its read mode and multiplexers 88 and 93 are switched back to the contrast and intensity settings determined by front panel controls (not shown). The stored color data now appears on four bit digital bus 111 and is fed to color position decoder 76. A detailed block diagram of color position decoder 76 is shown in FIG. 6.

It is extremely important to prevent the overlapping of color information on adjacent stripes. This can happen because the color position sensor produces a range of amplitudes during the time it passes between adjacent color stripes. By placing a space between each stripe in the form of a "white guard band" and detecting color sensor amplitudes which indicate that the scanning beam is illuminating this space, the writing of overlapping color information on the photosensitive media can be completely eliminated. The system which performs this task as well as determining the color stripe which the interrogating fiber optics cathode-ray tube beam is over is the microprocessor based color position decoder shown in FIG. 6.

Four bit digital output bus 111 from RAM Bank 104 is connected to four bit input latch 112 of Color Position decoder 76. Color position data is placed on microprocessor data bus 113 from this latch and is subsequently examined by the microprocessor logic to determine not only what color the data represents by detecting its level but also if it occurs in the appropriate sequence as compared to the previous color data examined. Knowledge of which color has just been displayed coupled with currently interrogated color data and an understanding of which color data (amplitude) should follow allows the microprocessor to determine which color signal should be allowed to pass to the amplifier 84 and to the fiber optic cathode-ray tube or if the present signal should be blanked in the case that it is indeterminate. ROM 114 contains the logic which drives the microprocessor's sequential states while RAM 115 stores the color data from latch 112 during the time it is being processed. The results of the processing are sent to output latch 116 where it is placed on line 77 if CRT should show red information, line 82 if green data should be displayed, line 83 if blue is appropriate and line 79 if the CRT should be blanked. Address bus 121 allows microprocessor 122 to control the color position decoder just discussed.

In order to fully comprehend how the color position decoder performs its function it is necessary to have an understanding of the software which drives the color position decoder. The annotated A/BASIC listing (Appendix A) will clarify the underlying concepts.

Summarizing the operation of the color video hardcopy recorder it captures sequential lines from alternate fields and scans them along the fiberoptics cathode ray tube multiple times until the next sequential line has been captured. In order to form a color copy the media which is moved past the CRT includes a photoresponsive layer and overlying or underlying colored transparent areas which act as filters. The recorder periodically scans the recording media to provide information which identifies the colored transparent areas. This information is used to control the application of signals to the sequential scan lines so that the photosensitive areas are exposed accordingly. The recorder provides a picture which can be viewed through the color transparent areas, in the case of a transparency or a paper copy in which the stripes overlay the emulsion, to present a color image. In the case of a paper copy, in which the stripes underly the emulsion, the recorder provides a picture which can be viewed by light reflected off of the color transparent areas, to present a color image.

What is claimed is:

1. A color video hard copy recorder in which a recording media having different areas for recording information representative of different colors is moved past a scanning light beam including
    means for periodically scanning said recording media with said light beam and providing signals identifying said different areas,
    means for controlling said scanning responsive to said signals to record different color information at said corresponding areas.

2. A color image recorder comprising:
    means providing a plurality of lines of video signals amplitude modulated to have color information,
    a color recording medium having a plurality of areas representing different colors,
    means for presenting said color recording medium to be exposed by said lines, means for periodically scanning said color recording medium to provide signals which identify the color areas, and means for controlling the lines of video signals to register the color information in said signal with the color areas whereby to record the color information at appropriate locations on said media.

3. A recording system for recording signals on a panchromatic photosensitive media having a plurality of transparent filter lines or stripes representing the primary colors separated by indexing stripes including means for scanning said media with uniform intensity scan lines and generating an indexing signal, and means for scanning said media with scan lines having modulated intensity correlated to the indexing signal to expose said media to provide a color recording.

4. A recording system for recording video signals comprising means for sequentially receiving lines from alternate fields of a video signal and storing and replaying said lines of video information to modulate a scanning light beam a plurality of times while the next line is being recorded, means for moving a recording media past said scanning light beam, said recording media including a photosensitive layer and a plurality of transparent colored areas, means for periodically scanning said recording media as it is moved past the light source to provide indexing signals serving to index said transparent colored areas, and means responsive to said indexing signals serving to control the light source whereby the color information in said scanned line is directed to expose the photosensitive media at the corresponding colored location whereby to form a color image.

5. A recording media for recording color images comprising a transparent non-opaque base material, a photosensitive layer carried on said base material and a plurality of transparent spaced color regions, carried adjacent said photosensitive layer.

6. A recording media as in claim 5 wherein said colored regions are in the form of stripes which are separated by clear spaces.

7. A recording media as in claim 6 wherein said colored stripes are disposed at an angle with respect to the longitudinal dimension of the photosensitive media.

8. A recording media as in claim 6 wherein said colored stripes are perpendicular to the longitudinal dimension of the photosensitive media.

9. A recording media as in claim 6 wherein said colored stripes transmit the primary colors.

10. A recording media as in claim 5 in which said colored regions overlay said photosensitive layer.

11. A recording media as in claim 5 in which said colored regions underlay said photosensitive layer.

12. A recording system for recording video images on a transparent non-opaque photosensitive media having a plurality of transparent filter lines or stripes representing a plurality of colors separated by indexing stripes including means for scanning said media with uniform intensity scan lines and generating signals indicative of particular line or stripe position, means for scanning said media with scan lines having modulated intensity correlated to the line or stripe position signals to expose said media to provide a color recording.

13. A recording system, as in claim 12, in which said means for generating signals indicative of particular line or stripe position on said photosensitive media, includes a detector means mounted such that light emanating from a scanning light beam must pass through said photosensitive media to impinge on said detector means.

14. A recording system as in claim 13 in which said detector employs an electro-photosensitive element overlayed with a colored filter.

15. A recording system as in claim 14 in which the filter is cyan colored to allow more green light to pass than blue light and more blue light to pass than red light.

16. A recording system, as in claim 10 in which said means for generating signals indicative of the transparent color line or stripe position on said transparent or translucent photosensitive media includes signal processing means for storing color position data between interrogation cycles.

17. A recording system, as in claim 16 in which the signal processing means utilizes the presence of indexing stripes to determine when to switch different color data signals to the scanning light beam modulation system.

18. A recording system as in claim 16 in which said signal processing means employs a pre-known sequence of colored stripes to decode the received color position data.

* * * * *